US009426540B2

(12) United States Patent
Lin (10) Patent No.: US 9,426,540 B2
(45) Date of Patent: Aug. 23, 2016

(54) METHOD FOR SELECTING AND BROADCASTING A MESSAGE, AND SYSTEM AND MESSAGE BROADCASTING SERVER FOR IMPLEMENTING THE METHOD

(71) Applicant: Agtop Technology Corp., Taipei (TW)

(72) Inventor: Hung-Yuan Lin, Taipei (TW)

(73) Assignees: Agtop Technology Corp., Taipei (TW); Hung-Yuan Lin, Taipei (TW)

( * ) Notice: Subject to any disclaimer, the term of this patent is extended or adjusted under 35 U.S.C. 154(b) by 0 days.

(21) Appl. No.: 14/745,731

(22) Filed: Jun. 22, 2015

(65) Prior Publication Data

US 2015/0373426 A1    Dec. 24, 2015

(30) Foreign Application Priority Data

Jun. 24, 2014 (TW) ............................. 103211101 U
Dec. 18, 2014 (TW) ............................. 103144327 A (51) Int. Cl.
| | |
|---|---|
| *H04N 7/10* | (2006.01) |
| *H04N 7/025* | (2006.01) |
| *H04N 7/173* | (2011.01) |
| *H04N 21/81* | (2011.01) |
| *H04N 21/414* | (2011.01) |
| *H04N 21/426* | (2011.01) |
| *H04N 21/61* | (2011.01) |
| *H04N 21/643* | (2011.01) |
| *H04N 21/262* | (2011.01) |
| *H04N 21/278* | (2011.01) |
| *H04N 21/226* | (2011.01) |
| *H04N 21/237* | (2011.01) |
| *H04N 21/25* | (2011.01) |
| *H04N 21/254* | (2011.01) |
| *H04N 21/258* | (2011.01) |

(Continued)

(52) U.S. Cl.
CPC .......... *H04N 21/812* (2013.01); *H04N 21/226* (2013.01); *H04N 21/237* (2013.01); *H04N 21/251* (2013.01); *H04N 21/254* (2013.01); *H04N 21/25808* (2013.01); *H04N 21/25866* (2013.01); *H04N 21/2668* (2013.01); *H04N 21/26258* (2013.01); *H04N 21/278* (2013.01); *H04N 21/4126* (2013.01); *H04N 21/41407* (2013.01); *H04N 21/42684* (2013.01); *H04N 21/4882* (2013.01); *H04N 21/6125* (2013.01); *H04N 21/6175* (2013.01); *H04N 21/64322* (2013.01); *H04N 21/8126* (2013.01)

(58) Field of Classification Search
None
See application file for complete search history.

(56) References Cited

U.S. PATENT DOCUMENTS

2008/0109307 A1* 5/2008 Ullah .................... G06Q 30/02
705/14.66
2008/0281926 A1* 11/2008 Walter ................... H04N 7/163
709/206

(Continued)

*Primary Examiner* — Nathan Flynn
*Assistant Examiner* — William J Kim
(74) *Attorney, Agent, or Firm* — The Webb Law Firm (57) ABSTRACT

A method for selecting and broadcasting a message is implemented using a message broadcasting server that is coupled to a mobile device and a multimedia device and that stores a plurality of messages therein. The multimedia device is operable to continuously send out a device identification, and the mobile device being operable to send a personal identification upon receiving the device identification from the multimedia device. In the method, the message broadcasting server executes the operations of: receiving the personal identification and the device identification from the mobile device; and selecting one of the messages and transmitting the same to at least one of the mobile device and the multimedia device.

19 Claims, 5 Drawing Sheets

(51) Int. Cl.
*H04N 21/2668* (2011.01)
*H04N 21/41* (2011.01)
*H04N 21/488* (2011.01)

(56) References Cited

U.S. PATENT DOCUMENTS

| | | | | |
|---|---|---|---|---|
| 2012/0096491 A1* | 4/2012 | Shkedi | H04N 21/4532 | 725/35 |
| 2013/0036434 A1* | 2/2013 | Shkedi | H04N 21/4524 | 725/14 |
| 2013/0217333 A1* | 8/2013 | Sprigg | H04W 4/008 | 455/41.2 |
| 2014/0086549 A1* | 3/2014 | Davidson | H04N 21/47214 | 386/201 |
| 2014/0129322 A1* | 5/2014 | George | G06Q 30/02 | 705/14.45 |
| 2014/0274031 A1* | 9/2014 | Menendez | H04W 52/0209 | 455/426.1 |
| 2016/0080806 A1* | 3/2016 | Ozeki | H04N 21/442 | 725/14 |

* cited by examiner

METHOD FOR SELECTING AND BROADCASTING A MESSAGE, AND SYSTEM AND MESSAGE BROADCASTING SERVER FOR IMPLEMENTING THE METHOD

CROSS-REFERENCE TO RELATED APPLICATION

This application claims priorities of Taiwanese Application No. 103211101, filed on Jun. 24, 2014, and Taiwanese Application No. 103144327, filed on Dec. 18, 2014.

FIELD

The disclosure relates to a method for selecting and broadcasting a message, and more particularly to a method for selecting a message based on a personal identification of a user.

BACKGROUND

Conventional mass communication involves using traditional mass media (e.g., television, radio, etc.) to broadcast messages, such as advertisements, to the audience. However, as the mobile technology advances, the traditional mass media become less engaged to the audience (that is, there are significantly more choices other than the traditional mass media for the audience), and the advertisement providers investing in the traditional mass media are getting less returns.

SUMMARY

Therefore, an object of the disclosure is to provide a method that can alleviate at least one of the drawbacks of the prior arts.

The method is for selecting and broadcasting a message. In one aspect, the method is to be implemented using a message broadcasting server. The message broadcasting server is coupled to a mobile device and a multimedia device, and stores a plurality of messages therein. The multimedia device is operable to continuously send out a device identification via short range wireless communication. The mobile device is operable to send a personal identification that is associated with a user of the mobile device, upon receiving the device identification from the multimedia device via the short range wireless communication. The method includes the steps of:

a) receiving the personal identification and the device identification from the mobile device;

b) in response to receipt of the personal identification and the device identification, selecting one of the messages to be broadcasted according to the personal identification; and c) transmitting the selected one of the messages to at least one of the mobile device and the multimedia device.

In another aspect, the method is to be implemented using a message broadcasting server and a mobile device coupled to the message broadcasting server. The message broadcasting server stores a plurality of messages therein and is to be coupled to a multimedia device that is operable to continuously send out a device identification via short range wireless communication. The method includes the steps of:

a) upon receiving the device identification from the multimedia device via the short range wireless communication, sending, by the mobile device, a personal identification and the device identification to the message broadcasting server, the personal identification being associated with a user of the mobile device;

b) in response to receipt of the personal identification and the device identification, selecting, by the message broadcasting server, one of the messages to be broadcasted according to the personal identification; and c) transmitting by the message broadcasting server, the selected one of the messages to at least one of the mobile device and the multimedia device.

Another object of the disclosure is to provide a message broadcasting server that is enabled to implement the aforementioned method.

According to the disclosure, the message broadcasting server is for selecting and broadcasting a message. The message broadcasting server is to be coupled to a mobile device and a multimedia device. The multimedia device is operable to continuously send out a device identification via short range wireless communication. The mobile device is operable to send a personal identification that is associated with a user of the mobile device, upon receiving the device identification from the multimedia device via the short range wireless communication. The message broadcasting server includes a central processing unit (CPU), a database storing a plurality of messages therein, and a network interface that enables communication via a network.

The message broadcasting server is enabled to receive the personal identification and the device identification from the mobile device via the network interface.

In response to receipt of the personal identification and the device identification, the CPU is programmed to select one of the messages stored in the database to be broadcasted according to the personal identification, and to transmit the selected one of the messages to at least one of the mobile device and the multimedia device.

Yet another object of the disclosure is to provide a system that includes the aforementioned message broadcasting server.

According to the disclosure, the system is for selecting and broadcasting a message, and includes a multimedia device, a mobile device and a message broadcasting server.

The multimedia device includes a first short-range wireless communication unit for continuously sending out a device identification. The mobile device includes a second short-range wireless communication unit for receiving data, and a storage medium storing therein a personal identification that is associated with a user of the mobile device. The message broadcasting server stores a plurality of messages therein.

Upon receiving the device identification from the multimedia device via the second short range wireless communication unit, the mobile device transmits the device identification and the personal identification to the message broadcasting server. In response to receipt of the personal identification and the device identification, the message broadcasting server is programmed to select one of the messages to be broadcasted according to the personal identification, and to transmit the selected one of the messages to at least one of the mobile device and the multimedia device.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that like elements are denoted by the same reference numerals throughout the disclosure.

Figure 1:
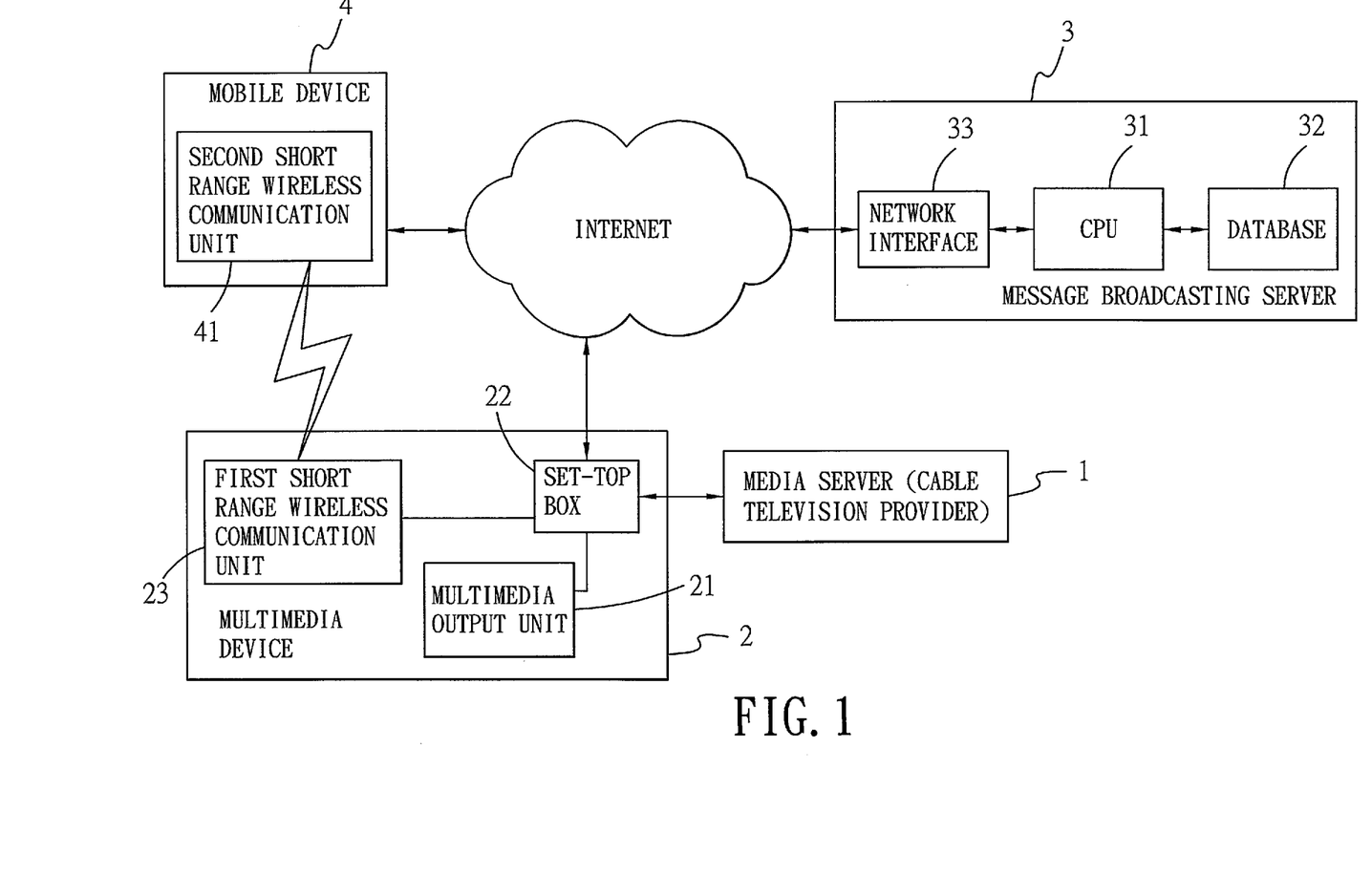
FIG. 1 is a block diagram illustrating a first embodiment of a system according to the disclosure.

FIG. 1 illustrates a system that includes a multimedia device 2, a message broadcasting server 3 and a mobile device 4. The system is configured for implementing a method (see FIG. 2) for selecting and broadcasting a message, according to the first embodiment of the disclosure.

The multimedia device 2 is coupled to a media server 1. In this embodiment, the media server 1 is a cable television provider server, and provides a plurality of broadcast programs and a program list. The program list includes a plurality of program identifications, and each of the program identifications is associated with a respective one of the broadcast programs.

The multimedia device 2 includes a multimedia output unit 21, a set-top box 22 and a first short range wireless communication unit 23. In this embodiment, the multimedia output unit 21 is a television set, and the set-top box 22 is coupled to the media server 1 via, for example, a cable for receiving the program list and the broadcast programs therefrom.

The first short range wireless communication unit 23 stores a device identification, and is operable to send out the device identification to be picked up by other devices that is in proximity (e.g., within a 10-meter range) to the first short range wireless communication unit 23. In this embodiment, the first short range wireless communication unit 23 conforms to iBeacon™ protocol standardized by Apple®, and is a Bluetooth® transceiving device, for example, using Bluetooth® low energy proximity sensing to transmit the device identification. In other embodiments, the first short range wireless communication unit 23 may be embodied as a Bluetooth® transmitter.

In another embodiment, the multimedia output unit 21, the set-top box 22 and the first short range wireless communication unit 23 of the multimedia device 2 may be integrated into a smart television.

The set-top box 22 is coupled to the message broadcasting server 3 via the Internet. The message broadcasting server 3 includes a central processing unit (CPU) 31, a database 32 and a network interface 33. The message broadcasting server 3 is capable of obtaining the program list from the multimedia device 2 (or the media server 1), and of storing the program list in the database 32. In this embodiment, the database 32 further stores a plurality of messages. Each of the messages may include advertisement content, and is associated with one of the program identifications.

The mobile device 4 may be embodied using a mobile phone, a tablet (e.g., an iPad®), a laptop computer, etc. In this embodiment, the mobile device 4 includes a second short range wireless communication unit 41 that stores a personal identification associated with a user of the mobile device 4. The personal identification may include information such as telephone number, gender, age, etc. The second short range wireless communication unit 41 may be embodied using a device similar to the first short range wireless communication unit 23, and is capable of communicating with the first short range wireless communication unit 23 within a certain range (e.g., 10 meters).

Figure 2:
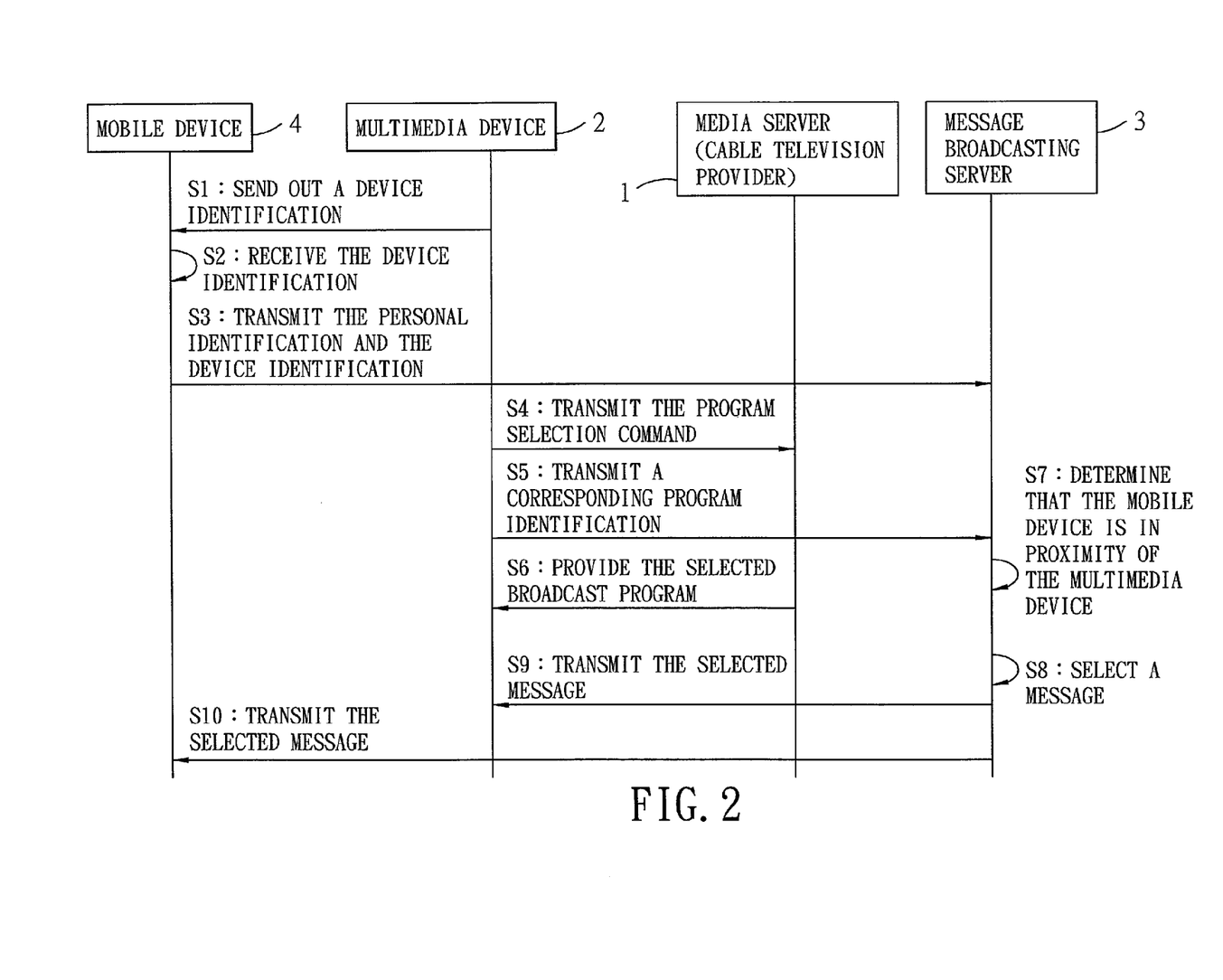
FIG. 2 is a flow chart of a method for selecting and broadcasting a message to be implemented by the system, according to the first embodiment.

In use, when the mobile device 4 comes within the certain range of the multimedia device 2 (that is, the user of the mobile device 4 may be interested in and currently watching a program broadcasted by the multimedia device 2), the system is enabled to implement the method as illustrated in FIG. 2.

In step S1, when the multimedia device 2 is active (e.g., powered on), the first short range wireless communication unit 23 of the multimedia device 2 continuously sends out the device identification.

When the second short range wireless communication unit 41 receives the device identification in step S2, the mobile device 4 in turn transmits the personal identification and the device identification to the message broadcasting server 3 in step S3.

Then, the user may operate the set-top box 22 of the multimedia device 2 (for example, using a remote controller) in order to select one of the broadcast programs to watch. In response, a program selection command, which is associated with the selected one of the broadcast programs, is generated by the set-top box 22. The set-top box 22 in turn transmits the program selection command to the media server 1 in step S4, and transmits to the message broadcasting server 3 a corresponding one of the program identifications, which indicates the selected broadcast program that is to be played by the multimedia device 2.

In step S6, the set-top box 22 of the multimedia device 2 receives the selected one of the broadcast programs provided by the media server 1 for playback.

In step S7, the message broadcasting server 3 determines, based on the personal identification and the device identification received from the mobile device 4 in step S3, that the mobile device 4 (and possibly the user thereof) that is indicated by the personal identification is in proximity of the multimedia device 2 that is indicated by the device identification.

Subsequently, in step S8, the CPU 31 of the message broadcasting server 3 selects one of the messages stored in the database 32 according to the personal identification and the device identification received from the mobile device 4 in step S3, and the corresponding one of the program identifications received from the multimedia device 2 in step S5.

Specifically, the personal identification and/or the corresponding one of the program identifications may be used to select one of the messages. For example, each of the messages is targeted to a particular age range (e.g., teenage, middle aged, old, etc.). Based on the personal identification which contains the age of the user and on the corresponding one of the program identifications, the message broadcasting server 3 is able to select one of the messages that corresponds to the age of the user and that is associated with the corresponding one of the program identifications.

In steps S9 and S10, the CPU 31 of the message broadcasting server 3 transmits the selected one of the messages to at least one of the media server 1 and the multimedia device 2, via the network interface 33. In this embodiment, the selected one of the messages is transmitted to both the media server 1 and the multimedia device 2, respectively in steps S9 and S10. In some embodiments, the selected one of the messages may be transmitted to only the mobile device 4. For example, when the multimedia device 2 is powered off before the moment of step S9, the selected one of the messages may be transmitted to only the mobile device 4, and step S10 is omitted.

Figure 3:
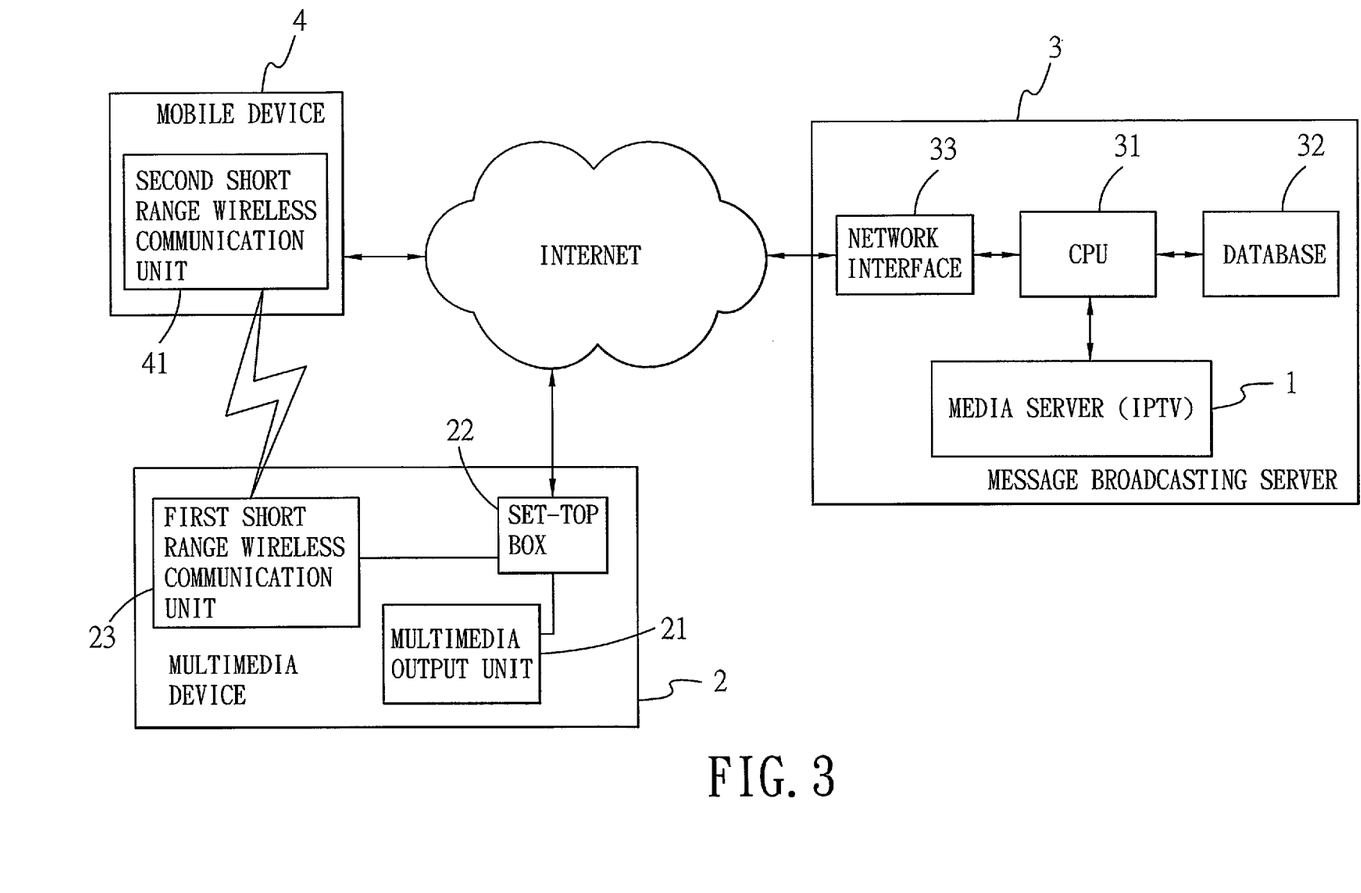
FIG. 3 is a block diagram illustrating a second embodiment of a system according to the disclosure.

FIG. 3 illustrates a system according to a second embodiment of the disclosure. In this embodiment, the media server 1 is associated with an Internet Protocol Television (IPTV) provider and is included in the message broadcasting server 3.

Figure 4:
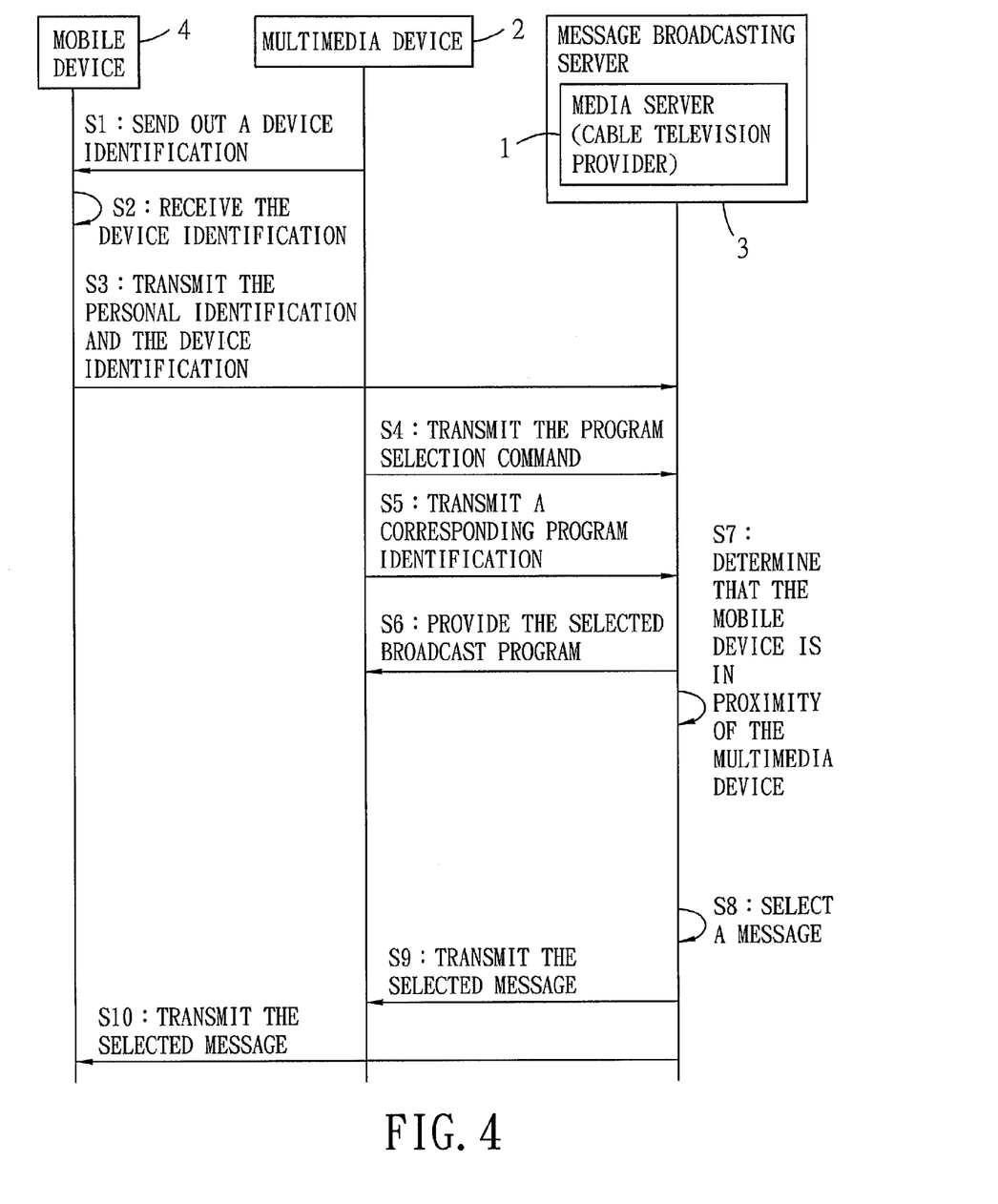
FIG. 4 is a flow chart of a method for selecting and broadcasting a message to be implemented by the system, according to the second embodiment.

FIG. 4 illustrates a flow chart of a method implemented by the system shown in FIG. 3. The method of FIG. 4 according to this embodiment is similar to that described in the first embodiment. As a result, a similar effect may be achieved.

Figure 5:
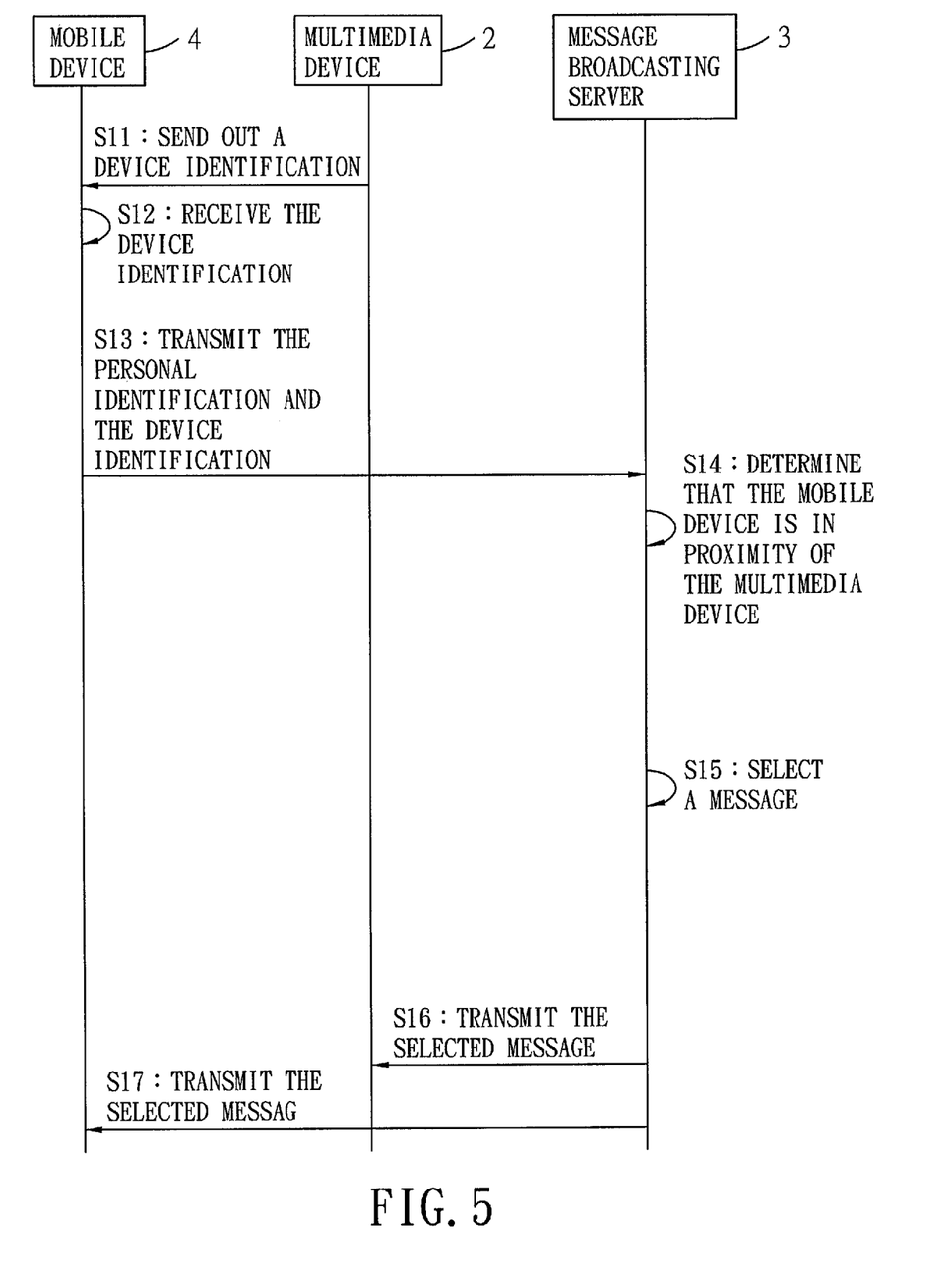
FIG. 5 is a flow chart of a method for selecting and broadcasting a message, according to an alternative embodiment of the disclosure.

FIG. 5 illustrates steps of a method according to an alternative embodiment of the disclosure. In this method, steps S11-S14, S16 and S17 are similar to steps S1-S3, S7, S9 and S10 of the method shown in FIG. 2, respectively, and the program identification is not considered in selecting the message in step S15. That is, the received personal identification is the only factor in selecting the message, and the content played by the multimedia device 2 is irrelevant.

To sum up, the system according to the disclosure is enabled to implement a method that uses the mobile device 4 to receive the device identification from the multimedia device 2 and to send out the received device identification and the personal identification stored therein to the message broadcasting server 3, in order to notify the message broadcasting server 3 that the mobile device 4 is in proximity of the multimedia device 2. The message broadcasting server 3 is in turn enabled to select one of the messages stored therein, and to transmit the selected one of the messages to at least one of the mobile device 4 and the multimedia device 2. In this manner, a relatively appropriate message (e.g., an advertisement) that somewhat fits the user of the mobile device 4 can be broadcasted to the user.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for selecting and broadcasting a message, the method to be implemented using a message broadcasting server that is coupled to a mobile device and a multimedia device and that stores a plurality of messages therein, the multimedia device being operable to continuously send out a device identification via short range wireless communication, the mobile device being operable to send a personal identification that is associated with a user of the mobile device upon receiving the device identification from the multimedia device via the short range wireless communication, the method comprising the steps of:
   a) receiving the personal identification and the device identification from the mobile device;
   b) in response to receipt of the personal identification and the device identification, selecting one of the messages to be broadcasted according to the personal identification; and
   c) transmitting the selected one of the messages to at least one of the mobile device and the multimedia device.

2. The method of claim 1, the multimedia device being coupled to a media server that provides a plurality of broadcast programs and that is operable to send to the multimedia device a program list, the program list including a plurality of program identifications, each of the program identifications being associated with one of the broadcast programs, each of the messages being associated with one of the program identifications, wherein:
   in step a), the message broadcasting server further receives one of the program identifications from the multimedia device, indicating an associated one of the broadcast programs that is to be played by the multimedia device; and
   in step b), the message broadcasting server selects one of the messages further according to said one of the program identifications received in step a).

3. The method of claim 2, the media server being a cable television provider server, the multimedia device including a set-top box for transmitting a program selection command to the media server, the program selection command including the one of the program identifications indicating the associated one of the broadcast programs,
   wherein, in step a), the message broadcasting server receives the program selection command from the set-top box via the Internet.

4. The method of claim 2, wherein the media server is associated with an Internet Protocol Television (IPTV) provider and is included in the message broadcasting server.

5. The method of claim 4, wherein in step a), the media server of the message broadcasting server receives a program selection command including the one of the program identifications indicating the associated one of the broadcast programs from a set-top box of the multimedia device via the Internet.

6. The method of claim 1, wherein each of the messages includes advertisement content.

7. A method for selecting and broadcasting a message, the method to be implemented using a message broadcasting server and a mobile device coupled to the message broadcasting server, the message broadcasting server storing a plurality of messages therein and to be coupled to a multimedia device that is operable to continuously send out a device identification via short range wireless communication, the method comprising the steps of:
   a) upon receiving the device identification from the multimedia device via the short range wireless communication, sending, by the mobile device, a personal identification and the device identification to the message broadcasting server, the personal identification being associated with a user of the mobile device;
   b) in response to receipt of the personal identification and the device identification, selecting, by the message broadcasting server, one of the messages to be broadcasted according to the personal identification; and
   c) transmitting by the message broadcasting server, the selected one of the messages to at least one of the mobile device and the multimedia device.

8. A system for selecting and broadcasting a message, comprising:
   a multimedia device including a first short-range wireless communication unit for continuously sending out a device identification;
   a mobile device including a second short-range wireless communication unit for receiving data, and a storage medium that stores therein a personal identification which is associated with a user of said mobile device; and
   a message broadcasting server storing a plurality of messages therein;
   wherein, upon receiving the device identification from said multimedia device via said second short range wireless communication unit, said mobile device transmits the device identification and the personal identification to said message broadcasting server;
   in response to receipt of the personal identification and the device identification, said message broadcasting server is programmed to select one of the messages to be broadcasted according to the personal identification, and to transmit the selected one of the messages to at least one of said mobile device and said multimedia device.

9. The system of claim 8, wherein:
said multimedia device is further coupled to a media server that provides a plurality of broadcast programs and that is operable to send to said multimedia device a program list, the program list including a plurality of program identifications, each of the program identifications being associated with one of the broadcast programs, each of the messages being associated with one of the program identifications;
said message broadcasting server further receives one of the program identifications from said multimedia device, indicating an associated one of the broadcast programs that is to be played by said multimedia device; and
said message broadcasting server selects one of the messages further according to said one of the program identifications received.

10. The system of claim 9, the media server being a cable television provider server, wherein, said multimedia device includes a set-top box for transmitting a program selection command to the media server, the program selection command includes the one of the program identifications indicating the associated one of the broadcast programs, and said message broadcasting server receives the program selection command from the set-top box via the Internet.

11. The system of claim 9, wherein the media server is associated with an Internet Protocol Television (IPTV) provider and is included in said message broadcasting server.

12. The system of claim 11, wherein said multimedia device further includes a set-up box, and said media server of said message broadcasting server receives a program selection command including the one of the program identifications indicating the associated one of the broadcast programs from said set-top box of said multimedia device via the Internet.

13. The system of claim 8, wherein each of the messages includes advertisement content.

14. A message broadcasting server for selecting and broadcasting a message, said message broadcasting server to be coupled to a mobile device and a multimedia device, the multimedia device being operable to continuously send out a device identification via short range wireless communication, the mobile device being operable to send a personal identification that is associated with a user of the mobile device upon receiving the device identification from the multimedia device via the short range wireless communication, said message broadcasting server comprising:

a central processing unit (CPU);
a database storing a plurality of messages therein; and
a network interface enabling communication via a network;
wherein said message broadcasting server is enabled to receive the personal identification and the device identification from the mobile device via said network interface;
in response to receipt of the personal identification and the device identification, said CPU is programmed to select one of the messages stored in said database to be broadcasted according to the personal identification, and to transmit the selected one of the messages to at least one of the mobile device and the multimedia device.

15. The message broadcasting server of claim 14, the multimedia device being coupled to a media server that provides a plurality of broadcast programs and that is operable to send to the multimedia device a program list, the program list including a plurality of program identifications, each of the program identifications being associated with one of the broadcast programs, each of the messages being associated with one of the program identifications, wherein:
said network interface is further enabled to receive one of the program identifications from the multimedia device, indicating an associated one of the broadcast programs that is to be played by the multimedia device; and
said CPU selects one of the messages further according to said one of the program identifications received via said network interface.

16. The message broadcasting server of claim 15, the media server being a cable television provider server, the multimedia device including a set-top box for transmitting a program selection command to the media server, the program selection command including the one of the program identifications indicating the associated one of the broadcast programs, wherein said network interface receives the program selection command from the set-top box via the Internet.

17. The message broadcasting server of claim 15, wherein the media server is associated with an Internet Protocol Television (IPTV) provider and said message broadcasting server further comprising the media server.

18. The message broadcasting server of claim 17, wherein said media server receives a program selection command including the one of the program identifications indicating the associated one of the broadcast programs from a set-top box of the multimedia device via the Internet.

19. The message broadcasting server of claim 14, wherein each of the messages includes advertisement content.

* * * * *